3,207,791  
POLYALKOXYHYDROXYAMINES  
Joseph A. Meyers III, Yeadon, and Edward G. Shay, King of Prussia, Pa., assignors to The Atlantic Refining Company, Philadelphia, Pa., a corporation of Pennsylvania  
No Drawing. Filed Sept. 19, 1962, Ser. No. 224,836  
5 Claims. (Cl. 260—584)

This invention relates to novel organic compounds having particular utility as low-foaming, synthetic non-ionic detergents. More particularly, this invention relates to novel organic compounds having the following general formula

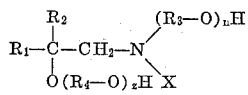

wherein $R_1$ and $R_2$ are selected from the group consisting of hydrogen and a hydrocarbon radical containing from 6 to 20 carbon atoms selected from the group consisting of alky, aryl, alkaryl and aralkyl radicals; $R_3$ and $R_4$ are alkylene radicals containing 2 to 4 carbon atoms; $n$ and $z$ are integers the sum of which ranges between 3 and 40 and X is a radical selected from the group consisting of

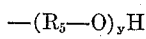

and

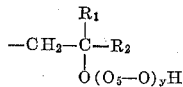

wherein $R_1$ and $R_2$ have the same significance as stated above; $R_5$ is an alkylene radical containing 2 to 4 carbon atoms and $y$ is an integer ranging from 1 to 40.

It is known in the art that non-ionic synthetic detergents of the alkylene oxide condensate type have high detergency, low-foaming characteristics which make them particularly suitable for home laundry and dishwashing machines, as well as for many industrial purposes.

The products of the instant invention possess these characteristics to a superior extent and, in addition, remain stable for prolonged periods of time.

It is, therefore, an object of this invention to provide synthetic non-ionic detergents having superior detergency properties.

It is another object of this invention to provide synthetic non-ionic detergents having low-foaming characteristics.

It is another object of this invention to provide synthetic non-ionic detergents which can be readily and economically spray dried or drum dried with builders to yield powdered products having high detergency-low foaming properties.

Other objects and advantages will become apparent from the following description and appended claims.

In accordance with this invention, a substituted amino alcohol, having the general formula

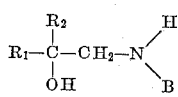

wherein $R_1$ and $R_2$ are selected from the group consisting of hydrogen and a hydrocarbon radical containing from 6 to 20 carbon atoms selected from the group consisting of alkyl, aryl, alkaryl, and aralkyl radicals, and B is a radical selected from the group consisting of —H and

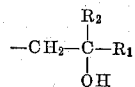

wherein $R_1$ and $R_2$ have the same significance as stated above, is condensed with an alkylene oxide in the presence of a catalyst. The condensation reaction is conducted at 100° C. to about 250° C., preferably at 150° to 220° C. The alkylene oxide is reacted with the substituted amino alcohol until the mole ratio of alkylene oxide to substituted amino alcohol is from about 3:1 to about 80:1. Mole ratios of 6:1 to 20:1 are most preferred. The preferred amino alcohols which may be utilized include 1-amino-2-octanol, di(2-hydroxy octyl)amine and di(2-hydroxy dodecyl)amine, which when reacted with alkylene oxide form the alkylene oxide condensates of 1-amino-2-octanol, di(2-hydroxy octyl)amine and di(2-hydroxy dodecyl)amine respectively.

The catalyst used may be any basic catalyst such as KOH, LiOH, NaOH, metallic sodium, a mixture of sodium hydroxide and sodium glycerophosphate, $K_2CO_3$ or $Na_2CO_3$. The alkali metal hydroxides and potassium carbonate are the most preferred catalysts. The catalyst may be added either in aqueous or solid form, but it is preferred to use solid catalysts. About 1 weight percent to about 13 weight percent of the catalyst, based on the weight of the amino alcohol, may be used, 1 weight percent to 4 weight percent being preferred.

Various salts and suspending agents may be added to the pure detergent of this invention to augment its detergency. These are termed "builders" and are usually phosphates, silicates, sulfates, carboxymethyl cellulose, and a wide variety of other materials. Built formulations prepared from the products of the instant invention gave excellent high detergency-low foam results as will be shown hereinafter. The following builder formulation was used to evaluate the detergency of the novel compounds of this invention:

|  | Percent by weight |
|---|---|
| Compounds of this invention | 15 |
| Sodium tripolyphosphate | 50 |
| Sodium sulfate | 33 |
| Carboxymethyl cellulose | 2 |

The synthetic detergents of this invention may be spray dried or drum dried with builders to form powders. In spray drying, the built detergent slurry is pumped to the top of a high tower and fed in a series of sprays at a temperature of about 150° F. The droplets are met by a concurrent stream of high temperature gas at 550° F. to 650° F. inlet and 250° F. to 300° F. outlet which evaporates the water from the droplets leaving them in the form of solid detergent particles on falling. Drum drying of the built detergent slurry may be accomplished in conventional equipment using about 100 pounds steam pressure in the drums.

The substituted amino alcohols which are condensed with an alkylene oxide to form the novel compounds of this invention may be prepared by the direct catalytic hydrogenation of the corresponding nitro alcohols using a palladium-on-charcoal catalyst in an alcohol solvent. Yields in excess of 80 percent are obtained when the hydrogenation is conducted at ambient temperatures and under a hydrogen pressure of 60 p.s.i.g. The hydrogenation is substantially complete in about one hour.

The substituted amino alcohols may also be prepared by condensing ammonia with 1,2-epoxy alkanes having the formula

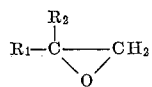

wherein $R_1$ and $R_2$ are selected from the group consisting of hydrogen and a hydrocarbon radical containing from 6 to 20 carbon atoms selected from the group consisting of alkyl, aryl, alkaryl and aralkyl radicals. This condensation is conducted at a temperature ranging between 30° C. to 180° C. for a period of time ranging between 15 minutes and 5 hours under autogenous pressure. Instead of using ammonia, it is convenient to use a concentrated aqueous ammonia, such as 30 percent ammonium hydroxide.

The built non-ionic detergents were tested in a standard Launderometer apparatus. The procedure and method of calculating detergency values differ in minor detail from that shown in "Carbon Soil Removal," P. T. Vitale et al., Soap and Chemical Specialties, volume 32, No. 6, pp. 41–44 (June 1956), and are described below. The Launderometer consists of a spindle mechanism rotating in a hot water thermostated bath. Mason jars of 1 pint capacity containing detergent, water, soiled cloth, and hard rubber balls for agitation are rotated on the spindle mechanism for a set time at a set rate in the hot water. The degree of cleaning is determined and the resulting numbers are the detergency values. These values are correlated with a standard anionic detergent having an arbitrarily assigned detergency value and a standard non-ionic detergent having an assigned detergency value based on the standard anionic detergent.

The detergency tests are conducted in the following manner:

The new cloth is cut into 4-inch wide strips across the bolt. Six strips are rolled up together and extracted with 500 cc. of acetone for 6 hours in a Soxhlet extraction apparatus. The strips are then removed and rinsed 3 times in distilled water, air dried until just barely damp, ironed until completely dry, and then placed in a 200° F. oven for 3 hours. At the end of this time, they are removed from the oven and set in a dessicator in a temperature and humidity controlled room.

The strips of cloth are soiled with the following composition:

| | |
|---|---|
| Commercial hydrogenated vegetable oil (trademarked Crisco) _____g__ | 0.9 |
| U.S.P. grade mineral white oil _____g__ | 3.1 |
| Lampblack _____g__ | 1.0 |
| Carbon tetrachloride _____ml__ | 500 |

The hydrogenated vegetable oil, mineral white oil and lampblack are mixed with sufficient carbon tetrachloride to just dissolve the oil and fat. The concentrated soil slurry is then passed through a small, hand-operated homogenizer and the balance of the carbon tetrachloride added. About 200 ml. of soil is placed in a nine-inch evaporating dish and a strip of the cloth is passed through this rapidly and smoothly three times. The cloth is hung to dry at room temperature for 2 hours ±15 minutes and is then cut into 2-inch by 2-inch swatches and read photometrically. The photometer is calibrated against a magnesia block with the standard equal to 100.

One-pint Mason jars are washed and set in the Launderometer rack. They are each filled with 6 ml. of 5 percent by weight solution of the above-mentioned built composition, 10 three-eighth inch diameter hard rubber balls, one soiled swatch, and enough 180 p.p.m. or 30 p.p.m. ("hard" or "soft" water, respectively) hardness water to make 100 ml. of solution. The final concentration of the built composition is 0.3 percent with the concentration of the active compounds of this invention being 0.045 percent by weight. The jars are capped, set on the spindle, and rotated at 40–42 r.p.m. for 20 minutes at 120° F. The jars are immediately removed, the height of the foam above the detergent solution in each jar is immediately noted (following one quick inversion of each jar), and the swatches are dried on paper and photometer readings taken.

The detergency is calculated in the following way:

$$\text{Raw detergency} = \frac{R-S}{V-S} \times 100 = L$$

where:

$R$=photometric percent reflectance of the washed cloth,
$S$=photometric percent reflectance of the soiled cloth,
$V$=photometric percent reflectance of the virgin cloth,
S usually ranges from 18 to 24,
V is practically a constant at 87,
R varies from 40–80.

The L value is then related to a standard value by a factor to give the final detergency:

$$D = L \times \frac{S_t}{L_s}$$

where:

$S_t$=the arbitrary detergency of the standard,
$L_s$=the L (raw detergency) value for the standard which is always run concurrently with the material being tested.

An arbitrary detergency ($S_t$) of 70 is assigned to a commonly used commercial anionic detergent which is employed as the standard. A non-ionic commercial detergent is used as a secondary standard and is assigned a detergency of 80 based on the assigned value of 70 for the standard anionic.

The detergency data obtained by testing various representative compounds of this invention in the examples which follow not only demonstrate the utility of the invention, but also demonstrate the superiority of these compounds over the standard anionic and non-ionic detergents available commercially.

The following examples are illustrative of the instant invention and should not be construed as limitative.

EXAMPLE I

To 8.75 grams (0.05 mol) of 1-nitro-2-octanol, there was added 100 ml. of anhydrous ethanol and 0.6 gram of 10 weight percent palladium-on-charcoal catalyst. This mixture was hydrogenated in a Parr shaker apparatus at 60 p.s.i.g. of hydrogen at a temperature of 25° C. for 18 hours. The catalyst was separated from the reaction mixture by filtration and the 1-amino-2-octanol was recovered by evaporation of the ethanol. The crude material was purified by vacuum distillation. That portion of distillate boiling at 69° C. at 0.1 mm. of mercury pressure was collected and identified by infra-red and elemental analysis which showed a nitrogen content of 9.6 percent, a carbon content of 65.3 percent and a hydrogen content of 13.01 percent compared with theoretical values of 9.7, 66.1 and 13.1 percent, respectively. The yield of 1-amino-2-octanol was 86.5 percent.

EXAMPLE II

Into a glass reaction flask there was placed 14 grams of 1-amino-2-octanol as prepared in Example I and 0.2 gram of powdered potassium hydroxide was added as a catalyst. The reaction mixture was heated to 150° C. while passing nitrogen therethrough. When the temperature reached 150° C., the passage of nitrogen was stopped, and the admission of ethylene oxide into the molten material was commenced. The exothermic reaction raised the temperature to 175° C. After 10 grams of ethylene oxide had reacted with the 2-amino octanol, a two-gram portion was removed (Sample No. 1). The reaction was continued until an additional 5 grams of ethylene oxide had been condensed, after which a second two-gram portion was removed (Sample No. 2). An additional 5 grams of ethylene oxide were condensed with the reaction mixture after which a third two-gram portion was removed (Sample No. 3). An additional 5 grams of ethylene oxide were condensed with the reaction mixture and a fourth two-gram portion was removed (Sample No. 4). Each sample was tested for detergency in the built formulation described above.

Table I summarizes the detergencies and foam heights at 0.3 concentration in 180 p.p.m. hardness water of the built detergent compositions.

*Table I*

| Sample Number | Detergency | Foam, ⅛ inches |
|---|---|---|
| 1 | 54 | 0 |
| 2 | 60 | 1 |
| 3 | 55 | 1 |
| 4 | 59 | 2 |

EXAMPLE III

To a stirred autoclave, there was charged 25.6 grams of 1,2-epoxy octane and 280 grams of 30 percent aqueous ammonium hydroxide. The mixture was heated to 150° C. for four hours under an autogenous pressure of 350 p.s.i.g. The reaction product was removed from the autoclave and placed in a separatory funnel. The autoclave was washed with 200 ml. of benzene. The bottom layer from the separatory funnel was withdrawn and discarded. The upper layer was recovered and charged to a fractional distillation apparatus. The benzene was stripped and that portion of material having a boiling point greater than 142° C. at 0.1 mm. of mercury pressure was recovered as di(2-hydroxy octyl)amine.

EXAMPLE IV

To 7.7 grams of the di(2-hydroxy octyl)amine produced in Example III contained in a glass reaction flask, there was added 0.2 gram of powdered potassium hydroxide as a catalyst. The reaction mixture was heated to a temperature of 200° C. while passing nitrogen therethrough. When the temperature reached 200° C., the passage of nitrogen was stopped, and the admission of ethylene oxide into the molten material was commenced. The exothermic reaction raised the temperature to 220° C. After 4 grams of ethylene oxide had reacted, a two-gram portion was removed (Sample No. 5). The reaction was continued until an additional 4 grams of ethylene oxide had been condensed, after which a second two-gram portion was removed (Sample No. 6). An additional 4 grams of ethylene oxide were condensed with the reaction mixture, after which a third two-gram portion was removed (Sample No. 7). An additional 4 grams of ethylene oxide were condensed with the reaction mixture, and a fourth two-gram portion was removed (Sample No. 8). Each sample was tested for detergency in the built formulation described above.

Table II summarizes the detergencies and foam heights at 0.3 concentration in 180 p.p.m. hardness water of the built detergent compositions.

*Table II*

| Sample Number | Detergency | Foam, ⅛ inches |
|---|---|---|
| 5 | 82 | 1 |
| 6 | 74 | 1 |
| 7 | 88 | 4 |
| 8 | 85 | 6 |

EXAMPLE V

Di(2-hydroxy dodecyl)amine was prepared by charging 18.4 grams of 1,2-epoxy dodecane and 280 grams of 30 percent aqueous ammonium hydroxide to an autoclave. The same procedure was followed as described in Example III and that material having a boiling point greater than 135° C. at 0.09 mm. of mercury pressure was recovered as product. This material, upon elemental analysis, had a nitrogen content of 3.91 percent, a carbon content of 75.0 percent and a hydrogen content of 13.1 percent as compared with theoretical values of 3.64, 74.8 and 13.2 percent, respectively.

EXAMPLE VI

Into a glass reaction flask there was placed 20 grams of di(2-hydroxy dodecyl)amine as prepared in Example V and 0.5 gram of powdered potassium hydroxide was added as a catalyst. The reaction mixture was heated to a temperature of 150° C. while passing nitrogen therethrough. When the temperature reached 150° C., the passage of nitrogen was stopped, and the admission of ethylene oxide into the molten material was commenced. The exothermic reaction raised the temperature to 180° C. After 16 grams of ethylene oxide had reacted, a two-gram portion was removed (Sample No. 9). The reaction was continued until an additional 4 grams of ethylene oxide had been condensed, after which a second two-gram portion was removed (Sample No. 10). An additional 4 grams of ethylene oxide were condensed with the reaction mixture, after which a third two-gram portion was removed (Sample No. 11). An additional 4 grams of ethylene oxide were condensed with the reaction mixture and a fourth two-gram portion was removed (Sample No. 12). Each sample was tested for detergency in the built formulation described above.

Table III summarizes the detergencies and foam heights at 0.3 concentration in 180 p.p.m. hardness water of the built detergent compositions.

*Table III*

| Sample Number | Detergency | Foam, ⅛ inches |
|---|---|---|
| 9 | 88 | 3 |
| 10 | 86 | 3 |
| 11 | 85 | 4 |
| 12 | 78 | 4 |

It is apparent from the foregoing examples that the compounds of this invention have particular utility as non-ionic detergents as evidenced by the detergency and foam values noted.

We claim:

1. A compound having the formula

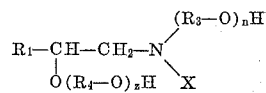

wherein $R_1$ is an alkyl radical containing from 6 to 20 carbon atoms; $R_3$ and $R_4$ are alkylene radicals containing from 2 to 4 carbon atoms; $n$ and $z$ are integers the sum of which ranges between 3 and 40 and X is a radical selected from the group consisting of

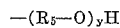

and

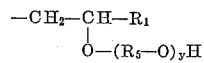

wherein $R_1$ is an alkyl radical containing from 6 to 20 carbon atoms; $R_5$ is an alkylene radical containing from 2 to 4 carbon atoms and $y$ is an integer ranging from 1 to 40.

2. A compound having the formula

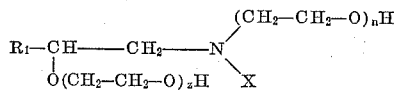

wherein $R_1$ is an alkyl radical containing from 6 to 20 carbon atoms; $n$ and $z$ are integers, the sum of which ranges between 3 and 40 and X is a radical selected from the group consisting of

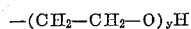

and

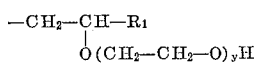

wherein $R_1$ is an alkyl radical containing from 6 to 20 carbon atoms and $y$ is an integer ranging from 1 to 40.

3. A compound having the formula

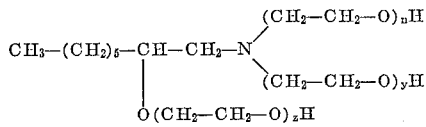

wherein $n$, $y$ and $z$ are integers, the sum of which ranges between 4 and 80.

4. A compound having the formula

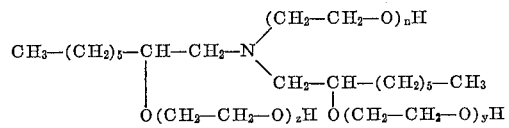

wherein $n$, $y$ and $z$ are integers, the sum of which ranges between 4 and 80.

5. A compound having the formula

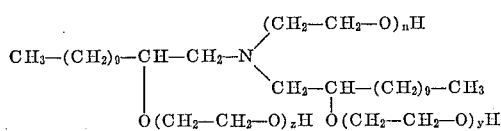

wherein $n$, $y$ and $z$ are integers, the sum of which ranges between 4 and 80.

References Cited by the Examiner

UNITED STATES PATENTS

| | | | |
|---|---|---|---|
| 2,231,758 | 2/41 | De Groote et al. | 260—584 |
| 2,674,619 | 4/54 | Lundsted | 260—584 |
| 2,763,529 | 9/56 | Albrecht et al. | 260—584 |

OTHER REFERENCES

Gakenheimer et al.: Jour. Org. Chem., volume 9 (1944), pages 85–8.

CHARLES B. PARKER, *Primary Examiner.*